Nov. 11, 1958     E. G. DORGELO ET AL     2,859,562
METAL GLASS SEALS AND METHODS OF MAKING SAME
Filed Oct. 12, 1955

INVENTOR
EDUARD GERHARDUS DORGELO
ANTONIUS WILHELMUS MATHEUS MICHIELSEN
BY
AGENT

United States Patent Office 2,859,562
Patented Nov. 11, 1958

2,859,562
METAL GLASS SEALS AND METHODS OF MAKING SAME

Eduard Gerhardus Dorgelo and Antonius Wilhelmus Matheus Michielsen, Eindhoven, Netherlands, assignors, by mesne assignments, to North American Philips Company, Inc., New York, N. Y., a corporation of Delaware Application October 12, 1955, Serial No. 540,094

Claims priority, application Netherlands October 15, 1954

1 Claim. (Cl. 49—92.5)

This invention relates to metal-to-glass seals and to methods of making same, and in particular to seals wherein the metal consists of an iron-base alloy containing nickel and cobalt as the principal alloying elements.

It is known to make satisfactory high-frequency seals by covering the iron alloy with a layer of molybdenum powder, which is then sintered to the alloy. The glass is then sealed thereto. Such seals, however, contain leaks and are not suitable for vacuum apparatus.

The chief object of the invention is to provide a method of producing a metal-to-glass seal or joint of the kind described above which produces joints free from leaks, and thus suitable for vacuumtight sealed vessels or the like.

According to the invention, in a method for producing a metal-to-glass seal of satisfactory high-frequency conductivity in which the metal consists of an iron-base alloy containing nickel and cobalt as the principal alloying elements, and in which the glass is sealed to the metal without employing a glass having a lower melting point, the metal is first coated with a layer of molybdenum by welding or soldering a molybdenum foil thereon. The resultant seal is free of the leaks found to be present in the prior art arrangements.

The invention will now be described with reference to the accompanying drawings, in which.

Figure 1:
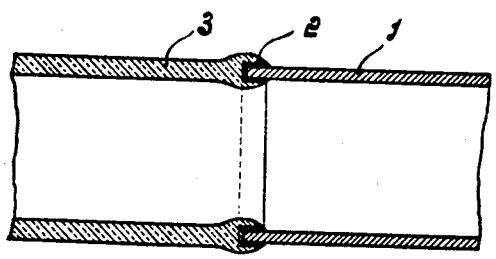
Fig. 1 shows one form of metal-glass seal in accordance with the invention.

Referring now to the drawing, in Fig. 1, reference numeral 1 designates a cylinder made of an iron-nickel-cobalt alloy containing for example 30% nickel, 20% cobalt, and the remainder iron, to one end of which is soldered a molybdenum foil 2, which is approximately 20 microns thick. The end of a cylinder 3 made of the so-called hard glass, e. g. borosilicate glass, embraces the layer 2 and thus is sealed directly to the metal 1.

Figure 2:
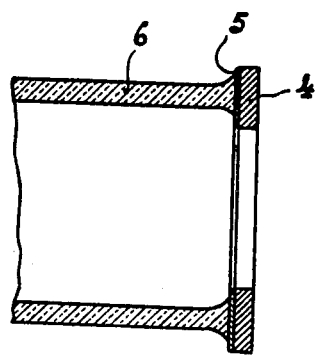
Fig. 2 shows another form of metal-glass seal in accordance with the invention.

In Fig. 2, reference numeral 4 designates a flat ring made of an iron-nickel-cobalt alloy to which a molybdenum ring 5, which is 40 microns thick, is welded by means of butt-welding. A cylinder 6 made of hard glass is sealed to the molybdenum ring.

In carrying out the method of the invention, any iron-nickel-cobalt alloy may be used as the metal. The most familiar ones go under the trade-name of "Kovar." The glasses naturally are the standard borosilicate hard glasses designed for sealing to these "Kovar"-type alloys. First, of course, the molybdenum foil, i. e., solid, impervious molybdenum, is soldered or welded to the metal, i. e., a vacuum-tight joint is provided employing a fusion process. The solder operation may be carried out with gold-nickel as the soldering agent, in which case a soldering temperature of about 1000° C. in an argon-hydrogen atmosphere will be satisfactory. The welding operation is conventional, and consists of merely passing a high current through the abutting molybdenum and alloy members.

Thereafter, the hard glass member is sealed to the metal. As one example thereof, the glass and metal are placed in abutting relationship and heated to about 850° C., at which temperature the glass softens and flows into intimate contact with the underlying molybdenum foil. Then, the seal is cooled, producing a vacuum-tight connection between the glass and metal.

While we have described our invention in connection with specific embodiments and applications, other modifications thereof will be readily apparent to those skilled in this art without departing from the spirit and scope of the invention as defined in the appended claim.

What is claimed is:

A metal-to-glass seal comprising a metal portion constituted of iron base alloy containing nickel and cobalt, a hard glass portion, and a molybdenum foil welded to and covering the metal portion at the junction between the metal portion and the glass portion, the glass portion being fused to the molybdenum foil portion to form therewith a vacuum-tight seal at the junction of the metal and the glass.

References Cited in the file of this patent

UNITED STATES PATENTS

| | | |
|---|---|---|
| 2,536,774 | Samuel | Jan. 2, 1951 |
| 2,664,180 | Peters | Dec. 29, 1953 |